(12) United States Patent
Yuan et al.

(10) Patent No.: US 7,769,561 B2
(45) Date of Patent: Aug. 3, 2010

(54) ROBUST SENSOR CORRELATION ANALYSIS FOR MACHINE CONDITION MONITORING

(75) Inventors: Chao Yuan, Secaucus, NJ (US);
Christian Balderer, Zurich (CH);
Tzu-Kuo Huang, Taipei (TW); Claus Neubauer, Monmouth Junction, NJ (US)

(73) Assignee: Siemens Corporation, Isein, NJ (US)

( * ) Notice: Subject to any disclaimer, the term of this patent is extended or adjusted under 35 U.S.C. 154(b) by 864 days.

(21) Appl. No.: 11/563,396

(22) Filed: Nov. 27, 2006

(65) Prior Publication Data

US 2007/0162241 A1 Jul. 12, 2007

Related U.S. Application Data

(60) Provisional application No. 60/741,298, filed on Dec. 1, 2005.

(51) Int. Cl.
*G06F 17/18* (2006.01)
(52) U.S. Cl. ............................ 702/179; 702/81; 702/82; 702/83; 702/84
(58) Field of Classification Search ................. 702/179, 702/81, 82, 83, 84
See application file for complete search history.

(56) References Cited

U.S. PATENT DOCUMENTS

| | | | |
|---|---|---|---|
| 2003/0065462 A1 | 4/2003 | Potyrailo | |
| 2003/0110007 A1* | 6/2003 | McGee et al. | ............... 702/179 |
| 2003/0224394 A1* | 12/2003 | Schadt et al. | .................. 435/6 |
| 2004/0181299 A1 | 9/2004 | Yamazaki et al. | |
| 2005/0163348 A1* | 7/2005 | Chen | .......................... 382/107 |

OTHER PUBLICATIONS

Campbell: "Robust Procedures in Multivariate Analysis I: Robust Covariance Estimation", Applied Statistics, Royal Statistical Society, London, GB, vol. 29, No. 3, 1980, pp. 231-237.

* cited by examiner

*Primary Examiner*—Carol S Tsai
*Assistant Examiner*—Ricky Ngon

(57) ABSTRACT

A method for monitoring machine conditions is based on machine learning through the use of a statistical model. A correlation coefficient is calculated using weights assigned to each sample that indicate the likelihood that that sample is an outlier. The resulting correlation coefficient is more robust against outliers. The calculation of the weight is based on the Mahalanobis distance from the sample to the sample mean. Additionally, hierarchical clustering is applied to intuitively reveal group information among sensors. By specifying a similarity threshold, the user can easily obtain desired clustering results.

12 Claims, 7 Drawing Sheets

1. begin initialize threshold, each sensor forms a cluster $C_i$
2.     do find nearest pair of clusters, say $C_i$ and $C_j$
3.         if dist($C_i$, $C_j$) < threshold
4.             merge $C_i$ and $C_j$
5.             update distance between clusters
6.         else
7.             break
8.     while true
9. end

ROBUST SENSOR CORRELATION ANALYSIS FOR MACHINE CONDITION MONITORING

CROSS REFERENCE TO RELATED APPLICATIONS

This application claims the benefit of U.S. Provisional Application Ser. No. 60/741,298 entitled "Robust Sensor Correlation Analysis for Machine Condition Monitoring," filed on Dec. 1, 2005, the contents of which are hereby incorporated by reference in their entirety.

FIELD OF THE INVENTION

The present invention relates generally to the field of machine condition monitoring, and more particularly, to techniques and systems for the statistical modeling of relationships among machine sensors from historical data.

BACKGROUND OF THE INVENTION

Many manufacturing and service equipment installations today include, in addition to systems for controlling machines and processes, systems for machine condition monitoring. Machine condition monitoring systems include an array of sensors installed on the equipment, a communications network linking those sensors, and a processor connected to the network for receiving signals from the sensors and making determinations on machine conditions from those signals.

The purpose of machine condition monitoring is to detect faults as early as possible to avoid further damage to machines. Traditionally, physical models were employed to describe the relationship between sensors that measure performance of a machine. Violation of those physical relationships could indicate faults. However, accurate physical models are often difficult to acquire.

An alternative to the use of physical models is the use of statistical models based on machine learning techniques. That approach has gained increased interest in recent decades. In contrast to a physical model, which assumes known sensor relationships, a statistical model learns the relationships among sensors from historical data. That characteristic of the statistical models is a big advantage in that the same generic model can be applied to different machines. The learned models differ only in their parameters.

To ensure the success of a statistical model, the sensors to be included in the model must be selected carefully. For example, for a regression model, which uses a set of input sensors to predict the value of an output sensor, the output sensor should be correlated with the input sensors. Large systems such as a power plant can contain over a thousand sensors. A systematic technique for exploring the relationship between sensors is therefore needed.

In the statistics field, correlation analysis has been extensively used to find the dependence between random variables. If the signal from each sensor is viewed as a random variable and its value at a certain time is viewed as an independent observation, it is possible to similarly apply statistical correlation analysis to sensors to find out their relationship. A well-known method is to calculate the correlation coefficient between two random variables x and y as:

$$\rho_{xy} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

where $[x_i, y_i]$ is the ith observation (or sample) of x and y. $\bar{x}$ and $\bar{y}$ are the observation means of x and y. n is the number of samples. For simplicity, $\rho_{xy}$ is also abbreviated as $\rho$.

The correlation coefficient defined above suffers from the effects of outliers. A single outlier could significantly lower the $\rho$ score between two random variables even if they are, in fact, highly correlated. To tackle that problem, researchers have proposed Spearman and Kendall correlation coefficients, which are known to be among the top performers.

After calculating $\rho$ for each pair of sensors, a cluster analysis may be performed in order to group the sensors according to their similarity. The well-known k-means clustering method requires a number of clusters to be specified. The value has little or no physical meaning. In addition, the classical k-means clustering technique requires the calculation of the mean of each cluster, which is not directly possible using the correlation-coefficient based measure.

There is therefore presently a need to provide a method and system for establishing relationships among sensors in a machine condition monitoring system using statistical models based on machine learning techniques. The technique should be capable of dealing with data containing outliers, and should have physically meaningful criteria for setting cluster parameters.

SUMMARY OF THE INVENTION

The present invention addresses the needs described above by providing several machine monitoring methods. A new technique is presented to calculate the correlation coefficient, which is more robust against outliers. A weight is assigned to each sample, indicating the likelihood that that sample is an outlier. The calculation of the weight is based on the Mahalanobis distance from the sample to the sample mean.

Additionally, hierarchical clustering is applied to intuitively reveal the group information among sensors. By specifying a similarity threshold, the user can easily obtain desired clustering results.

One embodiment of the invention is a method for machine condition monitoring. The method includes the step of determining a robust correlation coefficient $\rho_{xy}$ between pairs of sensors using data from a group of samples $(x_i, y_i)$ from the pairs of sensors. The robust correlation coefficient $\rho_{xy}$ is determined by initializing a weight $w_i$ for each sample $(x_i, y_i)$, wherein $0 \leq w_i \leq 1$ and $\Sigma w_i = 1$, each weight $w_i$ being proportional to an inverse of a distance between the sample $(x_i, y_i)$ and a sample mean; estimating a mean $\mu$ and covariance matrix $\Omega$ of the sample as $\mu = \Sigma w_i z_i$ and $\Omega = \Sigma w_i (z_i - \mu)(z_i - \mu)^T$, wherein $z_i = [x_i y_i]^T$; updating the weight $w_i$ for each observation $$(x_i, y_i) \text{ as } w_i = \frac{w(x_i, y_i)}{\sum w(x_j, y_j)} \text{ wherein}$$

$$w(x_i, y_i) = \begin{cases} 1 & f(x_i, y_i) < f_0 \\ f_0/f(x_i, y_i) & f(x_i, y_i) \geq f_0, \end{cases}$$

-continued wherein $$f(x_i, y_i) = (z_i - \mu)^T \Omega^{-1} (z_i - \mu); \text{ and}$$

repeating the estimating and updating steps until convergence. The robust correlation coefficient is calculated as $$\rho_{xy} = \frac{\sum_{i=1}^{n} w_i (x_i - \bar{x})(y_i - \bar{y})}{\sqrt{\sum_{i=1}^{n} w_i (x_i - \bar{x})^2} \sqrt{\sum_{i=1}^{n} w_i (y_i - \bar{y})^2}}$$

where $\bar{x} = \Sigma w_i x_i$ and $\bar{y} = \Sigma w_i y_i$. The method further includes the step of predicting sensor readings using the robust correlation coefficient.

The method may also include the step of clustering the sensors based on the robust correlation coefficient. The clustering may be a hierarchical clustering.

The step of clustering the sensors may further include the steps of initializing a cluster list by placing each sensor in its own cluster $C_i$; determining distances between pairs of clusters $$d_{avg}(C_i, C_j) = \frac{1}{|C_i||C_j|} \sum_{x \in C_i} \sum_{y \in C_j} d_{xy},$$

wherein $d_{xy} = 1 - abs(\rho_{xy})$; and, if a lowest of the distances $d_{avg}(C_i, C_j)$ is smaller than a threshold, combining the respective clusters $C_i$, $C_j$, updating the cluster list and continuing with the determining step.

Another method for machine condition monitoring includes the steps of receiving a group of readings from a plurality of sensors; for at least one pair of sensors (x, y) of the plurality of sensors, determining a robust correlation coefficient $\rho_{xy}$, using a plurality of samples $(x_i, y_i)$ from the group of readings, and using a weight $w_i$ for each sample $(x_i, y_i)$ based on how closely the sample obeys a joint distribution of the readings of the pair of sensors (x, y); and clustering the sensors in a hierarchical cluster scheme using distances calculated from the robust correlation coefficient $\rho_{xy}$.

The robust correlation coefficient $\rho_{xy}$ may be determined as detailed above, and the clustering of the sensors may be performed as detailed above.

The method may further include the step of adjusting the threshold to adjust a dissimilarity of sensors in each cluster. The weight $w_i$ for each sample $(x_i, y_i)$ may further be based on a Mahalanobis distance from the sample to a sample mean.

Another embodiment of the invention is a computer-usable medium having computer readable instructions stored thereon for execution by a processor to perform the methods described above.

DESCRIPTION OF THE INVENTION

Figure 1:
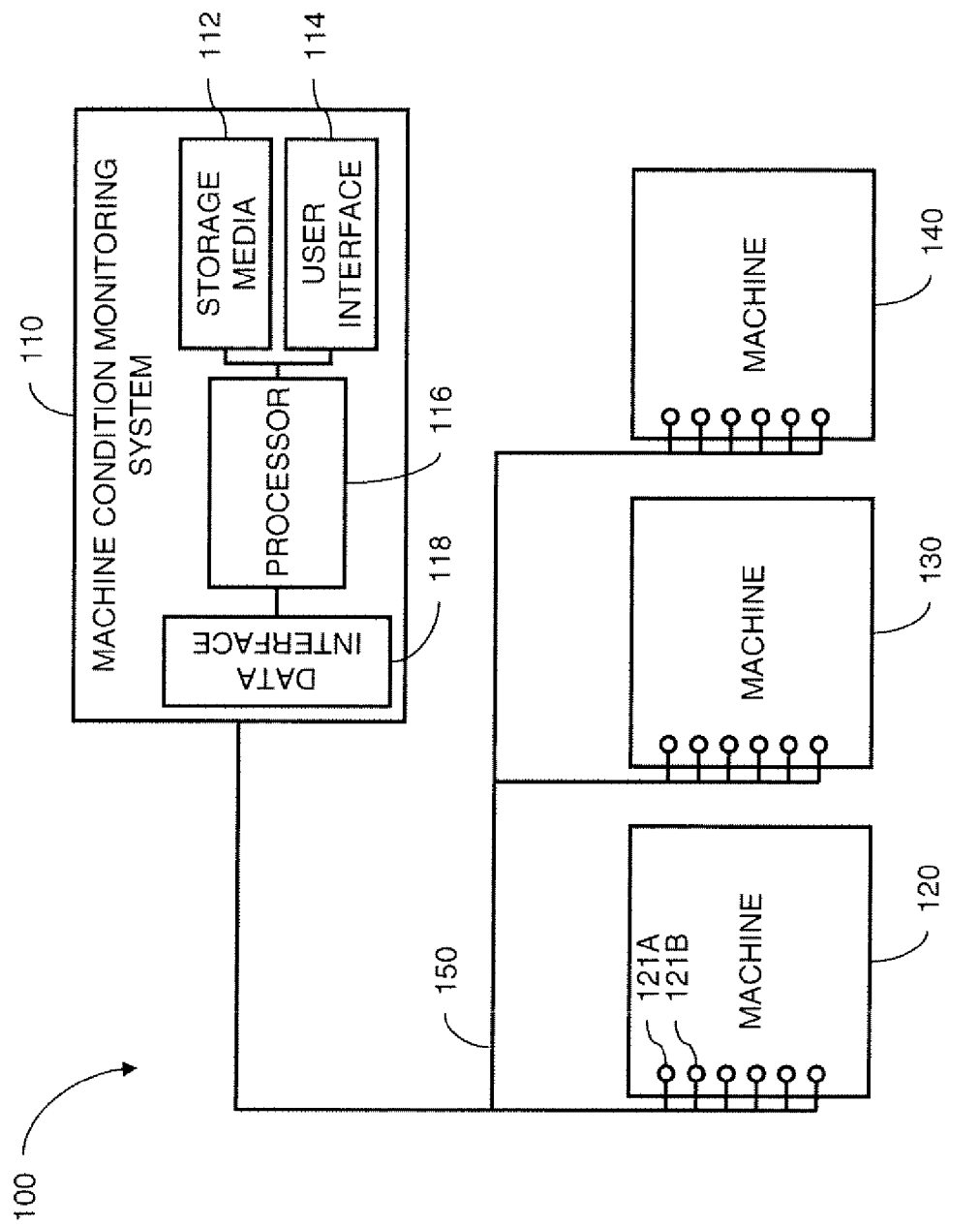
FIG. 1 is a schematic illustration of a system for machine condition monitoring according to one embodiment of the invention.

A system 110 for monitoring conditions of machines 120, 130, 140 according to one embodiment of the invention is shown in FIG. 1. The system includes a plurality of machine sensors such as the sensors 121A, 121B connected to machine 120. The sensors may, for example, be accelerometers, temperature sensors, flow sensors, position sensors, rate sensors, chemical sensors or any sensor that measures a condition of a machine or process. The sensors measure conditions chosen because they are related in predictable ways that reflect the presence or absence of normal operating conditions in an installation 100.

The sensors 121A, 121B are connected through a data network 150 to a data interface 118 in a machine condition monitoring system 110. A processor 116 receives the sensor data from the data interface 118 and performs the monitoring methods of the invention. The processor is connected to storage media 112 for storing computer-readable instructions that, when executed, perform the monitoring methods. The storage media 112 may also store historical data received from the sensors 121A, 121B. A user interface 114 is provided for communicating results and receiving instructions from a user.

Robust Correlation Coefficient

The correlation coefficient ρ between x and y is ideally calculated from good samples that represent the joint distribution of x and x. Due to the existence of outliers (observations that lie outside the overall pattern of a distribution), however, the estimated ρ using prior art methods is often incorrect. To obtain a correct correlation coefficient ρ, outliers must either be removed from samples or their effects must be reduced in the calculation of the correlation coefficient ρ.

In the present invention, the second approach, reducing the effect of outliers, is used. In many cases, it is difficult or impossible to set a clear boundary between normal samples and outliers. Instead of requiring a binary outlier decision (yes or no) on a sample, the technique of the present invention assigns weights $w_i$ to samples. If a sample obeys the joint distribution of x and y, that sample is given a high weight; otherwise, it is given a low weight. The weights $w_i$ are defined such that $0 \leq w_i \leq 1$ and $\Sigma w_i = 1$. Each sample can be represented by a vector $[x_i \, y_i \, w_i]$. The calculation of the correlation coefficient ρ, in robust form, therefore becomes:

$$\rho_{xy} = \frac{\sum_{i=1}^{n} w_i (x_i - \bar{x})(y_i - \bar{y})}{\sqrt{\sum_{i=1}^{n} w_i (x_i - \bar{x})^2} \sqrt{\sum_{i=1}^{n} w_i (y_i - \bar{y})^2}}$$

where $\bar{x} = \Sigma w_i x_i$ and $\bar{y} = \Sigma w_i y_i$. In addition to ρ, other measures may be transformed into a corresponding robust form, as demonstrated below.

A weight $w_i$ must be assigned to each sample [x y]. To do so, a statistic f(x,y) is developed such that the probability of $f(x,y)<f_0$ is very large (such as 0.95), where $f_0$ is a threshold. That provides a criterion to distinguish outliers from normal samples.

For a sample $[x_i, y_i]$, if $f(x_i, y_i)<f_0$, it is concluded that that sample obeys the distribution. If $f(x_i, y_i) \geq f_0$, it is concluded that that sample violates the distribution, because the probability for that sample to occur under the distribution is very low (such as 0.05). When the sample violates the distribution, a decreasing weight $w_i$ is assigned to it based on the deviation of $f(x_i, y_i)$ from $f_0$. The weighting function is defined as:

$$w(x_i, y_i) = \begin{cases} 1 & f(x_i, y_i) < f_0 \\ f_0/f(x_i, y_i) & f(x_i, y_i) \geq f_0 \end{cases}$$

Figure 2:
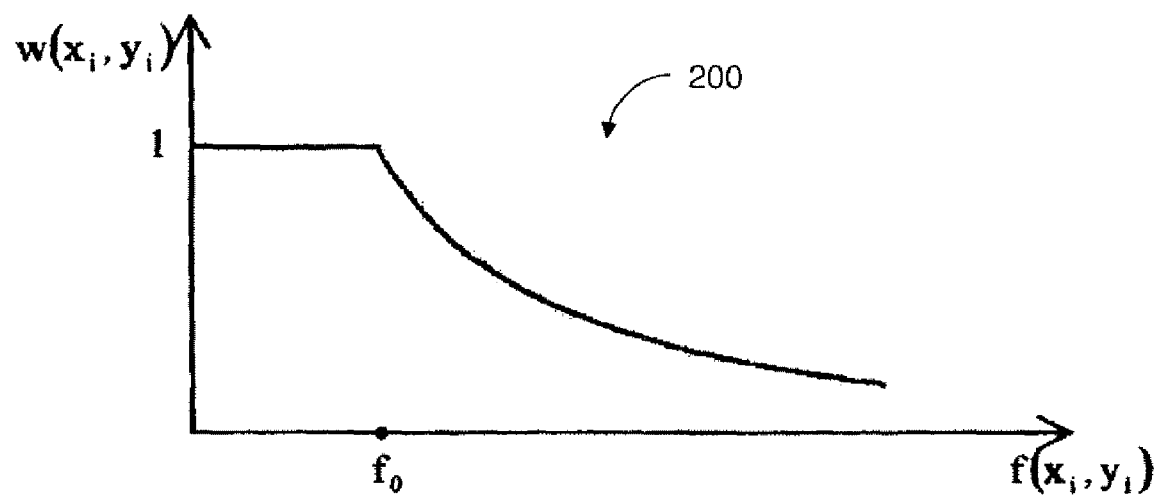
FIG. 2 is plot showing a weighting function according to one embodiment of the invention.

The shape of the weighting function $w(x_1, y_1)$ is illustrated in the graph 200 of FIG. 2. $w_1$ is simply the normalized version of $w(x_1, y_1)$:

$$w_i = \frac{w(x_i, y_i)}{\sum w(x_j, y_j)}$$

The function $f(x_1, y_1)$ is defined to be the Mahalanobis distance from the mean of [x y]. By so defining the function $f(x_1, y_1)$, it is implicitly assumed that x and y satisfy a joint Gaussian distribution $N(\mu, \Omega)$, where $\mu$ is the mean and $\Omega$ is the covariance matrix. Let $z_i=[x_i\ y_i]^T$. $f(x_1, y_1)$ can be expressed as:

$$f(z_i) = (z_i - \mu)^T \Omega^{-1} (z_i - \mu)$$

It can be proved that f(z) satisfies a chi-square distribution. As noted above, a preferred embodiment of the invention requires that the probability of $f(z)<f_0$ is 0.95, if z is a good sample. That suggests the use of $f_0=6.0$ based on the standard chi-square distribution lookup table. Note that the Mahalanobis distance can be used in cases where the distribution of x and y is not Gaussian, since in most cases, outliers are located far from the mean of the distribution. The same weighting strategy is applied to estimate $\mu$ and $\Omega$, since standard ways to calculate them also suffer from outliers. The estimates of $\mu$ and $\Omega$ are defined as:

$$\mu = \Sigma w_i z_i, \text{ and}$$

$$\Omega = \Sigma w_i (z_i - \mu)(z_i - \mu)^T.$$

Figure 3:
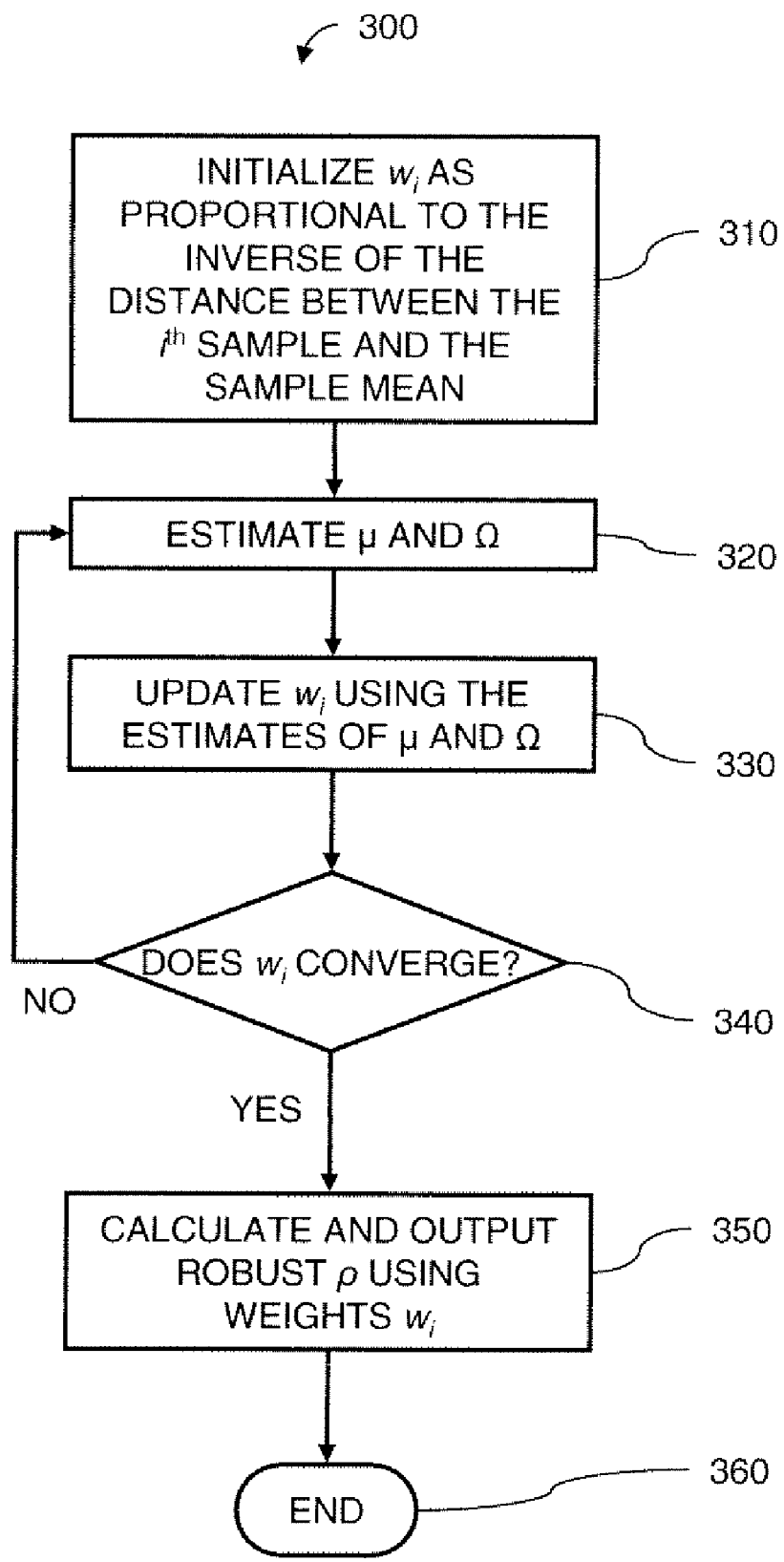
FIG. 3 is a flow chart showing a method according to one embodiment of the invention.

A method for calculating the correlation coefficient $\rho$, shown in FIG. 3, may now be defined as a series of steps for execution by a processor:

1. Initialize $w_i$ (step 310) by calculating the sample mean and assigning to each weight $w_i$ a value proportional to the inverse of the distance between the $i^{th}$ sample and the sample mean.
2. Estimate $\mu$ and $\Omega$ (step 320) as described above, using the sample weights $w_i$ and $z_i=[x_i\ y_i]^T$.
3. Update $w_i$ (step 330) using the estimates of $\mu$ and $\Omega$, by expressing $f(x_i, y_i)$ as $f(z_i)=(z_i-\mu)^T\Omega^{-1}(z_i-\mu)$, substituting in the weighting function $w(x_i, y_i)$:

$$w(x_i, y_i) = \begin{cases} 1 & f(x_i, y_i) < f_0 \\ f_0/f(x_i, y_i) & f(x_i, y_i) \geq f_0, \end{cases}$$

and normalizing to find $w_i$:

$$w_i = \frac{w(x_i, y_i)}{\sum w(x_j, y_j)}$$

4. If the algorithm converges (decision 340), continue; otherwise, return to Step 2.
5. Calculate and output (step 350) the robust correlation coefficient $\rho$ for each sample $(x_i, y_i)$, as $$\rho_{xy} = \frac{\sum_{i=1}^{n} w_i (x_i - \bar{x})(y_i - \bar{y})}{\sqrt{\sum_{i=1}^{n} w_i (x_i - \bar{x})^2} \sqrt{\sum_{i=1}^{n} w_i (y_i - \bar{y})^2}},$$

and end the process (block 360).

Figure 4:
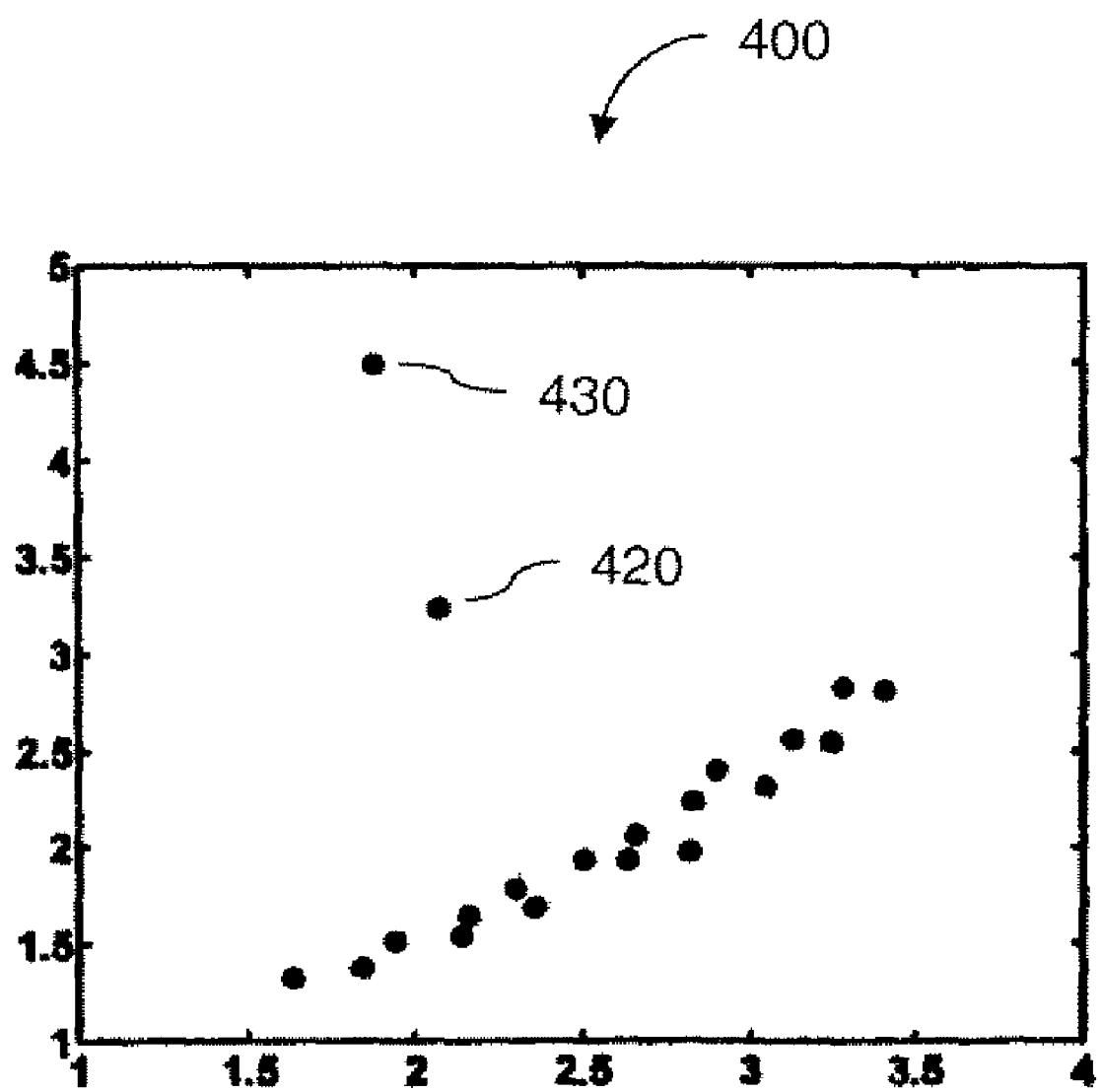
FIG. 4 is plot showing data used in testing a method of the invention.

An example data set 400 including 20 samples with two outliers 420, 430 located at [2.1, 3.2] and [1.8, 4.5], respectively, is shown in FIG. 4. Using the unweighted method discussed in the background section above for calculating the correlation coefficient $\rho_{xy}$, the result is $\rho=0.254$. Apparently, that result is corrupted by the two outliers 420, 430. If those two outliers are excluded, the same unweighted equation yields the ideal $\rho=0.973$. The method of the invention discussed above produces $\rho=0.923$. For comparison, the Spearman and Kendall correlation coefficient estimators produce $\rho=0.582$ and 0.605, respectively. The method of the present invention produces the best correlation coefficients; i.e., the correlation coefficients that are closest to the ideal value.

Hierarchical Sensor Clustering

A hierarchical clustering method is used for clustering sensors for several reasons. First, the output of hierarchical clustering provides the user with a graphical tree structure, which is intuitive and easy to analyze. Second, by specifying different similarity thresholds corresponding to different levels of the tree, a user can easily obtain preferred clustering results. Such a threshold is directly related to the correlation relationship among sensors.

To create a clustering schema, the correlation coefficient $\rho_{xy}$ is initially converted into a distance-based dissimilarity measure, which is often used in the clustering literature:

$$d_{xy} = 1 - \text{abs}(\rho_{xy}).$$

In general, one of the following three functions is used to measure the distance between two clusters $C_i$ and $C_j$:

$$d_{min}(C_i, C_j) = \min_{\substack{x \in C_i \\ y \in C_j}} d_{xy};$$

$$d_{max}(C_i, C_j) = \max_{\substack{x \in C_i \\ y \in C_j}} d_{xy}; \text{ or}$$

$$d_{avg}(C_i, C_j) = \frac{1}{|C_i||C_j|} \sum_{x \in C} \sum_{y \in C} d_{xy}.$$

The inventors have chosen the third function, $d_{avg}$, which is also known as complete linkage. That choice guarantees that all sensors in a cluster have a correlation coefficient larger than the user-specified threshold.

Figure 5:
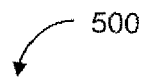
FIG. 5 is a pseudocode listing showing an implementation of a method according to one embodiment of the invention.

The implementation of the above hierarchical clustering technique is as follows. A matrix is used to store the pair-wise distances $d_{avg}$, and a list is used to store clusters $C_i$. In each step, the data is searched for the closest pair of clusters. That pair is merged, and the distance matrix and the cluster list are updated accordingly. If the distance of the closest pair is larger then the threshold, the process is stopped and the resulting clusters are returned. Note that the correlation coefficient must be transformed into a dissimilarity value as described above. A pseudocode representation 500 of the method is presented in FIG. 5.

Test Results

Figure 6:
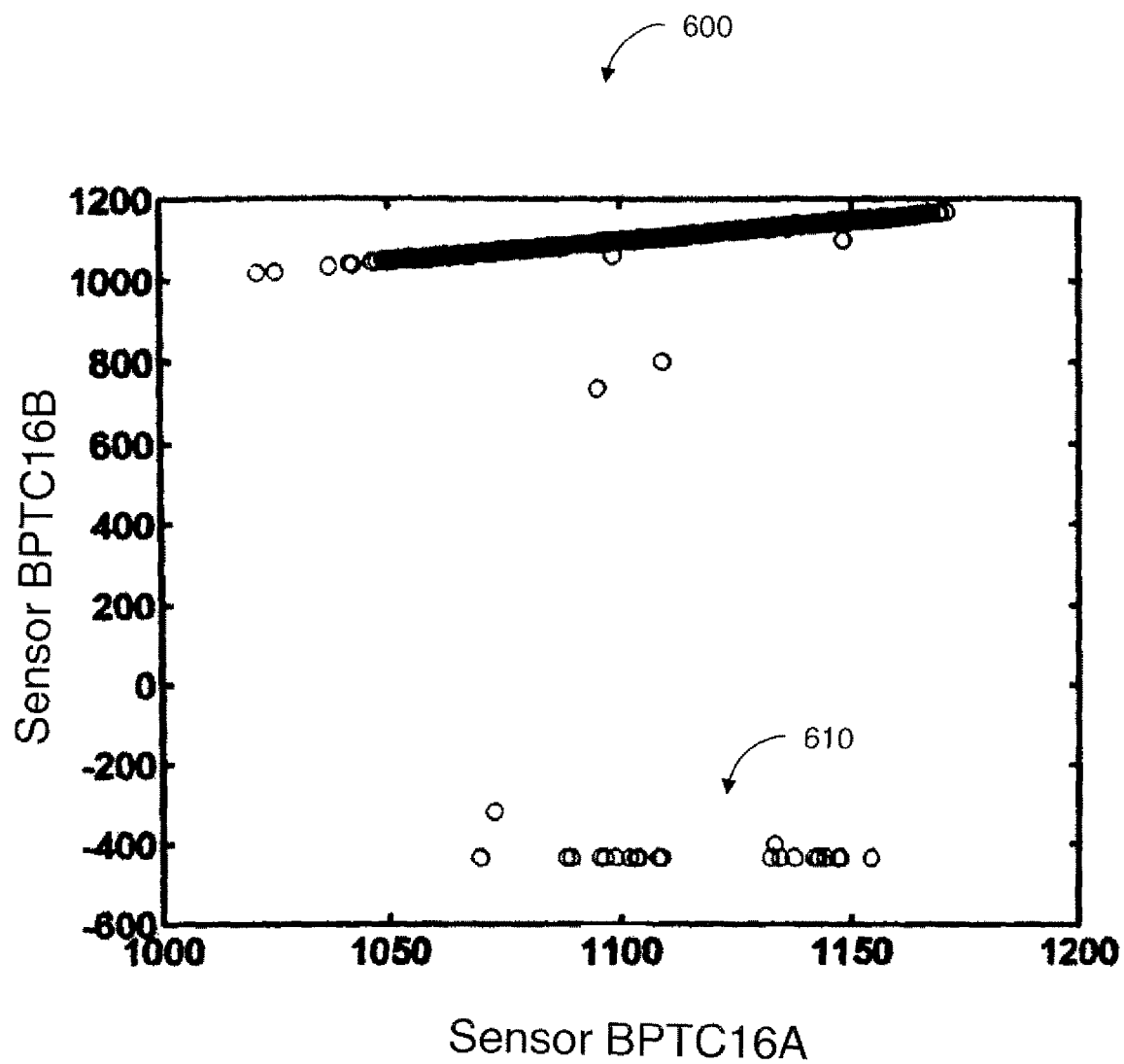
FIG. 6 is plot showing data used in testing a method of the invention.

The methods of the invention have been experimentally applied to real power plant data. The data set contained 35 sensors, including power (MW), inlet guide vane actuator position (IGV), inlet temperature (T1C), and 32 blade path temperature (BPTC) sensors: BPTC1A, BPTC1B, BPTC2A . . . BPTC16B. Each sensor has values corresponding to 2939 time stamps (i.e., 2939 samples). According to domain knowledge, MW and IGV are correlated and all 32 BPTC sensors are highly correlated. High absolute correlation coefficients are expected between correlated sensors. Among the 32 correlated BPTC sensors, the last sensor (BPTC16B) produced several extremely small values as compared with the remaining values. The plot 600 of FIG. 6 shows the sample distribution between BPTC16A and BPTCl6B. The outliers 610 can be clearly seen. Using the unweighted method discussed in the background section above, the correlation coefficient $\rho_{xy}$=0.2532 for those two sensors. Using the method of the invention, the robust correlation coefficient $\rho_{xy}$=0.9993, which reflects the correct correlation between those two sensors.

Figure 7:
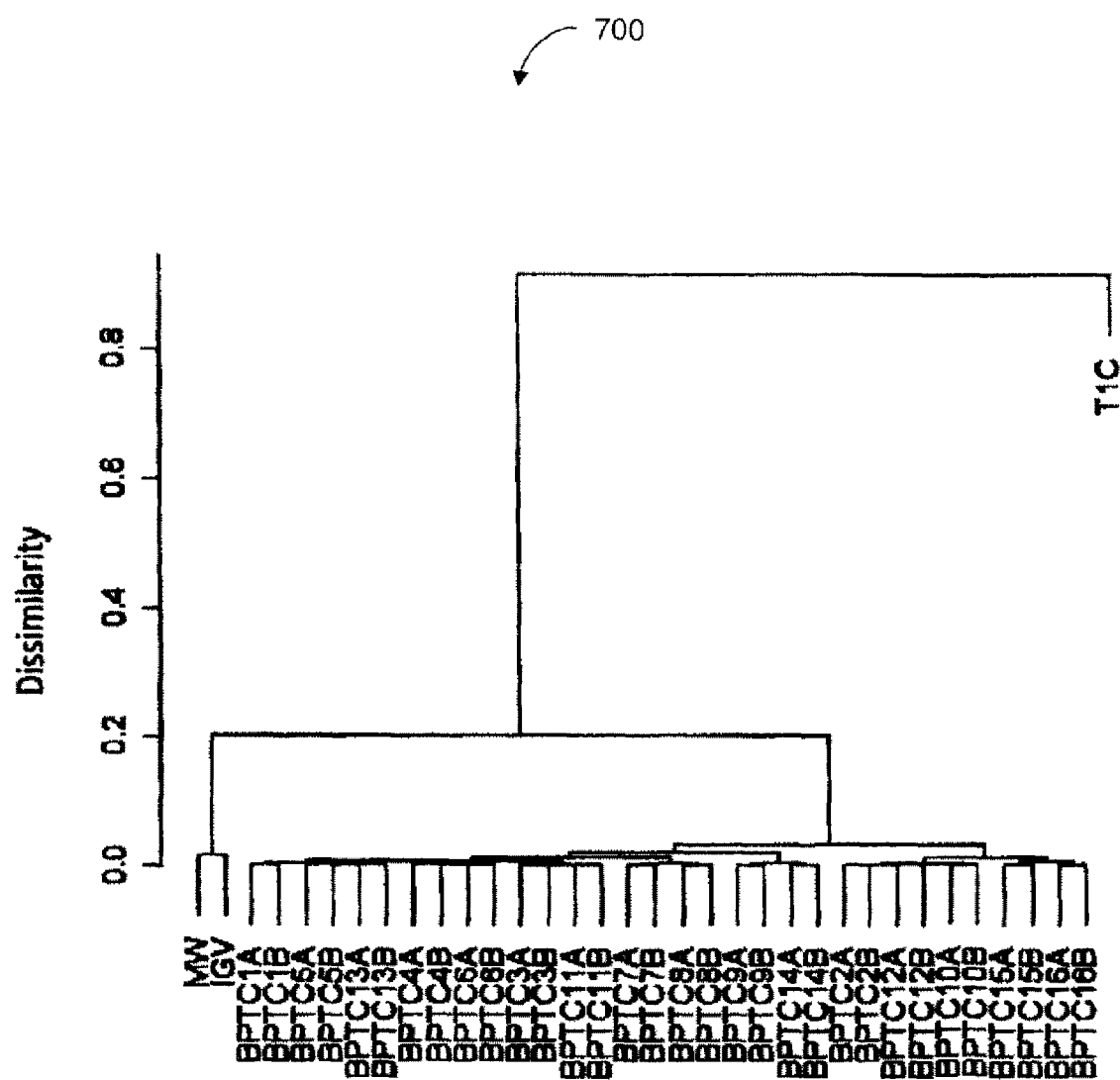
FIG. 7 is plot showing hierarchical clustering as a function of cluster dissimilarity according to one embodiment of the invention.

Hierarchical clustering of that data in accordance with the invention is shown in FIG. 7. The y-axis denotes the dissimilarity values between the pairs of joined clusters. The tree is cut according to the threshold and a cluster is formed for each new sub-tree. For a dissimilarity threshold of 0.1, three clusters are produced: {MW, IGV}, {BPTC1A . . . BPTC16B} and {T1C}. For a threshold of 0.3, two clusters are produced: {MW, IGV, BPTC1A . . . BPTC16B} and {T1C}.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the method is disclosed herein as describing machine condition monitoring in an industrial environment, the method may be used in any environment where conditions are monitored by sensors having relationships that are repeatable, while remaining within the scope of the invention. For example, the invention may be applied to an agricultural system, a highway traffic system or a natural ecological system. It is to be understood that the embodiments shown and described herein are only illustrative of the principles of the present invention and that various modifications may be implemented by those skilled in the art without departing from the scope and spirit of the invention.

What is claimed is:

1. A method for machine condition monitoring, comprising the steps of:
   in a machine condition monitoring system processor, determining a robust correlation coefficient $\rho_{xy}$ between pairs of sensors using data from a group of samples ($x_i$, $y_i$) from the pairs of sensors, the robust correlation coefficient $\rho_{xy}$ being determined by:
   initializing a weight $w_i$ for each sample ($x_i$, $y_i$), wherein $0 \leq w_i \leq 1$ and $\Sigma w_i = 1$, each weight $w_i$ being proportional to an inverse of a distance between the sample ($x_i$, $y_i$) and a sample mean;

estimating a mean $\mu$ and covariance matrix $\Omega$ of the sample as $\mu = \Sigma w_i z_i$ and $\Omega = \Sigma w_i (z_i - \mu)(z_i - \mu)^T$, wherein $z_i = [x_i, y_i]^T$;
   updating the weight $w_i$ for each observation ($x_i$, $y_i$) as $$w_i = \frac{w(x_i, y_i)}{\sum w(x_j, y_j)}$$

wherein $w(x_i, y_i) = \begin{cases} 1 & f(x_i, y_i) < f_0 \\ f_0/f(x_i, y_i) & f(x_i, y_i) \geq f_0 \end{cases}$, wherein $f(x_i, y_i) = (z_i - \mu)^T \Omega^{-1}(z_i - \mu)$; and $f_0$ is a predetermined threshold probability; and
   repeating the estimating and updating steps until convergence;
   calculating the robust correlation coefficient as $$\rho_{xy} = \frac{\sum_{i=1}^{n} w_i(x_i - \bar{x})(y_i - \bar{y})}{\sqrt{\sum_{i=1}^{n} w_i(x_i - \bar{x})^2} \sqrt{\sum_{i=1}^{n} w_i(y_i - \bar{y})^2}}$$

where $\bar{x} = \Sigma w_i x_i$ and $\bar{y} = \Sigma w_i y_i$; and
   predicting sensor readings using the robust correlation coefficient.

2. The method of claim 1, further comprising the step of:
   clustering the sensors based on the robust correlation coefficient.

3. The method of claim 2, wherein the clustering is a hierarchical clustering.

4. The method of claim 2, wherein the step of clustering the sensors further comprises:
   initializing a cluster list by placing each sensor in its own cluster $C_i$;
   determining distances between pairs of clusters $$d_{avg}(C_i, C_j) = \frac{1}{|C_i||C_j|} \sum_{x \in C} \sum_{y \in C} d_{xy},$$

wherein $d_{xy} = 1 - \text{abs}(\rho_{xy})$; and
   if a lowest of the distances $d_{avg}(C_i, C_j)$ is smaller than a threshold, combining the respective clusters $C_i$, $C_j$, updating the cluster list and continuing with the determining step.

5. A method for machine condition monitoring, comprising the steps of:
   receiving a group of readings from a plurality of sensors;
   in a machine condition monitoring system processor, for at least one pair of sensors (x, y) of the plurality of sensors, determining a robust correlation coefficient $\rho_{xy}$, using a plurality of samples ($x_i$, $y_i$) from the group of readings, and using a weight $w_i$ for each sample ($x_i$, $y_i$) based on how closely the sample obeys a joint distribution of the readings of the pair of sensors (x, y), the robust correlation coefficient being calculated as $$\rho_{xy} = \frac{\sum_{i=1}^{n} w_i(x_i - \overline{x})(y_i - \overline{y})}{\sqrt{\sum_{i=1}^{n} w_i(x_i - \overline{x})^2} \sqrt{\sum_{i=1}^{n} w_i(y_i - \overline{y})^2}}$$

where $\overline{x} = \Sigma w_i x_i$ and $\overline{y} = \Sigma w_i y_i$; and clustering the sensors in a hierarchical cluster scheme using distances calculated from the robust correlation coefficient $\rho_{xy}$.

6. The method of claim 5, wherein the weights $w_i$ are determined by:

initializing the weight $w_i$ for each sample $(x_i, y_i)$, wherein $0 \leq w_i \leq 1$ and $\Sigma w_i = 1$, each $w_i$ being proportional to an inverse of a distance between the sample $(x_i, y_i)$ and a sample mean;

estimating a mean $\mu$ and covariance matrix $\Omega$ of the sample as $\mu = \Sigma w_i z_i$ and $\Omega = \Sigma w_i (z_i - \mu)(z_i - \mu)^T$, wherein $z_i = [x_i y_i]^T$;

updating the weight $w_i$ for each sample $(x_i, y_i)$ as $$w_i = \frac{w(x_i, y_i)}{\sum w(x_j, y_j)}$$

wherein $w(x_i, y_i) = \begin{cases} 1 & f(x_i, y_i) < f_0 \\ f_0 / f(x_i, y_i) & f(x_i, y_i) \geq f_0 \end{cases}$, wherein $f(x_i, y_i) = (z_i - \mu)^T \Omega^{-1}(z_i - \mu)$; and $f_0$ is a predetermined threshold probability; and repeating the estimating and updating steps until convergence.

7. The method of claim 5, wherein the step of clustering the sensors further comprises:

initializing a cluster list by placing each sensor in its own cluster $C_i$;

determining distances between pairs of clusters $$d_{avg}(C_i, C_j) = \frac{1}{|C_i||C_j|} \sum_{x \in C} \sum_{y \in C} d_{xy},$$

wherein $d_{xy} = 1 - abs(\rho_{xy})$; and if a lowest of the distances $d_{avg}(C_i, C_j)$ is smaller than a threshold, combining the respective clusters $C_i$, $C_j$, updating the cluster list and continuing with the determining step.

8. The method of claim 7, further comprising the step of:

adjusting the threshold to adjust a dissimilarity of sensors in each cluster.

9. The method of claim 5, wherein the weight $w_i$ for each sample $(x_i, y_i)$ is further based on a Mahalanobis distance from the sample to a sample mean.

10. A non-transitory computer-usable medium having computer readable instructions stored thereon for execution by a processor to perform a method comprising:

receiving a group of readings from a plurality of sensors;

for at least one pair of sensors $(x, y)$ of the plurality of sensors, determining a robust correlation coefficient $\rho_{xy}$, using a plurality of samples $(x_i, y_i)$ from the group of readings, and using a weight $w_i$ for each sample $(x_i, y_i)$ based on how closely the sample obeys a joint distribution of the readings of the pair of sensors $(x, y)$, the robust correlation coefficient being calculated as $$\rho_{xy} = \frac{\sum_{i=1}^{n} w_i(x_i - \overline{x})(y_i - \overline{y})}{\sqrt{\sum_{i=1}^{n} w_i(x_i - \overline{x})^2} \sqrt{\sum_{i=1}^{n} w_i(y_i - \overline{y})^2}}$$

where $\overline{x} = \Sigma w_i x_i$ and $\overline{y} = \Sigma w_i y_i$; and clustering the sensors in a hierarchical cluster scheme using distances calculated from the robust correlation coefficient $\rho_{xy}$.

11. The non-transitory computer-usable medium of claim 10, wherein the weights $w_i$ are determined by:

initializing the weight $w_i$ for each sample $(x_i, y_i)$, wherein $0 \leq w_i \leq 1$ and $\Sigma w_i = 1$, each $w_i$ being proportional to an inverse of a distance between the sample $(x_i, y_i)$ and a sample mean;

estimating a mean $\mu$ and covariance matrix $\Omega$ of the sample as $\mu = \Sigma w_i z_i$ and $\Omega = \Sigma w_i (z_i - \mu)(z_i - \mu)^T$, wherein $z_i = [x_i y_i]^T$;

updating the weight $w_i$ for each sample $(x_i, y_i)$ as $$w_i = \frac{w(x_i, y_i)}{\sum w(x_j, y_j)}$$

wherein $w(x_i, y_i) = \begin{cases} 1 & f(x_i, y_i) < f_0 \\ f_0 / f(x_i, y_i) & f(x_i, y_i) \geq f_0 \end{cases}$, wherein $f(x_i, y_i) = (z_i - \mu)^T \Omega^{-1}(z_i - \mu)$; and $f_0$ is a predetermined threshold probability; and repeating the estimating and updating steps until convergence.

12. The non-transitory computer-usable medium of claim 10, wherein the step of clustering the sensors further comprises:

initializing a cluster list by placing each sensor in its own cluster $C_i$;

determining distances between pairs of clusters $$d_{avg}(C_i, C_j) = \frac{1}{|C_i||C_j|} \sum_{x \in C} \sum_{y \in C} d_{xy},$$

wherein $d_{xy} = 1 - abs(\rho_{xy})$; and if a lowest of the distances $d_{avg}(C_i, C_j)$ is smaller than a threshold, combining the respective clusters $C_i$, $C_j$, updating the cluster list and continuing with the determining step.

* * * * *